US005374802A

United States Patent [19]

Dorfman et al.

[11] Patent Number: 5,374,802

[45] Date of Patent: * Dec. 20, 1994

[54] VORTEX ARC GENERATOR AND METHOD OF CONTROLLING THE LENGTH OF THE ARC

[75] Inventors: Leonid P. Dorfman, Athens; Sanjay Sampath, Sayre; Michael J. Scheithauer, Ulster; Jack E. Vanderpool, Laceyville, all of Pa.

[73] Assignee: Osram Sylvania Inc., Danvers, Mass.

[ * ] Notice: The portion of the term of this patent subsequent to Mar. 22, 2011 has been disclaimed.

[21] Appl. No.: 999,623

[22] Filed: Dec. 31, 1992

[51] Int. Cl.[5] .......... B23K 9/00

[52] U.S. Cl. .......... 219/121.52; 219/121.5; 219/121.51; 219/121.59; 313/231.51

[58] Field of Search .......... 219/121.59, 121.5, 121.51, 219/121.52, 75, 121.48, 121.36; 313/231.21, 231.31, 231.41, 231.51

[56] References Cited

U.S. PATENT DOCUMENTS

| | | | |
|---|---|---|---|
| 2,892,676 | 6/1959 | Donald et al. | 219/75 |
| 2,922,869 | 1/1960 | Giannini et al. | 219/75 |
| 2,960,594 | 11/1960 | Thorpe | 219/75 |
| 2,966,575 | 12/1960 | Libby | 219/75 |
| 2,990,466 | 6/1961 | Cresswell | 219/75 |
| 3,027,446 | 3/1962 | Browning | 219/75 |
| 3,061,710 | 10/1962 | Browning et al. | 219/75 |
| 3,118,046 | 1/1964 | Harrington | 219/75 |
| 3,183,337 | 5/1965 | Winzeler et al. | 219/76 |
| 3,197,605 | 7/1965 | Sunnen | 219/76 |
| 3,297,899 | 1/1967 | Pratt et al. | 313/231 |
| 3,869,593 | 3/1975 | New et al. | 219/121.52 |
| 4,535,225 | 8/1985 | Wolf et al. | 313/231.41 |
| 4,620,080 | 10/1986 | Arata et al. | 219/121.5 |
| 4,656,330 | 4/1987 | Poole | 219/121.52 |
| 4,764,656 | 8/1988 | Browning | 219/121.44 |
| 4,788,408 | 11/1988 | Wlodarczyk et al. | 219/121.49 |

*Primary Examiner*—Mark H. Paschall
*Attorney, Agent, or Firm*—Robert F. Clark

[57] ABSTRACT

A DC plasma arc generator and method of operation to reduce erosion of the internal parts. The arc generator includes a generally cylindrical anode and a generally cylindrical interelectrode having critical dimensions and spacing to allow introduction of vortical gas flows and stabilization of the primary arc thereby, reducing degradation and erosion of the generator.

11 Claims, 2 Drawing Sheets

VORTEX ARC GENERATOR AND METHOD OF CONTROLLING THE LENGTH OF THE ARC

RELATION TO OTHER APPLICATIONS

This invention relates to our copending application Ser. No. 07/999,642 U.S. Pat. No. 5,296,670, filed concurrently herewith.

BACKGROUND OF THE INVENTION

The present invention relates to DC plasma arc generators and particularly to a method and means for controlling the length of vortex-stabilized DC plasma arcs.

DESCRIPTION OF THE PRIOR ART

Vortex-stabilized DC plasma arc generators are well known in the art. To attach an arc to its hollow exit electrode a vortex-stabilized, axially positioned DC arc must bend radially at the end and form a conducting path, commonly called a finger. The finger establishes itself at an angle to the axis of the plasma gas flow and sometimes splits into several fingers. The fingers wander, that is, they constantly change the spots of attachments. In some cases the overall length of the arc decreases at higher currents and reduces the voltage drop across the arc despite higher current.

Controlling the arc length within a broad range of arc currents and dynamic gas conditions with an exit step which causes sudden expansion and turbulence of the plasma flow is well known. The flow of gas, however, displaces the attachment of the arc to the front edge of the anode and creates erosion and damage. To reduce damage to the electrode, electromagnetic stabilization of the arc attachment is provided by rotating the arc along the wall of the anode with a solenoid and magnetic core.

The provision of a solenoid and a magnetic core together with water cooling of these components to control the length of the arc in the plasma generator results in a bulky and complicated design. The dimensional requirements for the exit step with a solenoid result in thermal losses and reduced thermal efficiency of the plasma generator. Moreover, the internal diameter of the exit step must be fairly large, which results in a loose contact of the gas with the arc adjacent the exit step to produce poor heating of the gas and decrease the thermal efficiency of the plasma generator.

An efficient way to stabilize a plasma arc is through the use of tangential injection of a plasma gas into the arc chamber. A vortex is created within the arc housing which provides collimation, constriction and directional stabilization of the plasma arc. By controlling the gas flow rate the arc can be blown out of the nozzle and attached to the nozzle exterior, or the arc attachment can be kept within the nozzle. Such arc attachment to the hollow exit electrode seriously hinders the injection of material into the plasma flame through the walls of the electrode. Materials should be injected below, or downstream of, the spot where the arc attaches to the nozzle. However, it is very difficult to control the site of arc attachment through gas dynamics, especially when coupled with the complications caused by erosion of the nozzle. Thus, prevention of nozzle erosion is not just a matter of extending the life of the generator but rather is a design demand to satisfy two conflicting requirements, arc attachment and material injection.

It has been found that short, high-current, low-voltage, vortex-stabilized DC plasma arcs (less than one inch, above 300 amps and below 60 volts) are very "stiff" in terms of their attachment to a hollow exit electrode. While the arc column is stabilized in its axial direction because of pressure gradients within the vortex caused by the tangential introduction of gases, the arc is not spinning. It attaches itself to one spot of the exit electrode and causes rapid erosion and asymmetrical temperature distribution of the plasma effluent, thereby seriously impairing the uniformity of material processing with plasmas. Thus such arcs with self-establishing lengths cannot be forced to spin by tangential introduction of gases and will not stay attached to a predetermined area of the exit electrode without interfering with the material injection area.

SUMMARY OF THE INVENTION

According to the present invention, there is provided a DC plasma generator having two portions, an arc constricting portion (an interelectrode) and an exit step portion (an anode). In the constricting portion, a gas is injected tangentially to the axis, adjacent the cathode. The swirling gas moves from its injection point through the constricting portion and into the exit step portion. The portions are physically and electrically separated from one another. The juncture between them is provided with flanges arranged in a face-to-face relation. The flanges can withstand electrical arcing between them. A gas injection slit or orifice is provided between the flanges for tangential introduction of a gas to generate a vortical gas flow which is tangential to and intersects with the vortical flow of the gas that was injected into the constricted portion of the generator. The exit portion of the electrode is directly connected to the corresponding terminal of a DC power supply, and the cathode is disposed at the other end of the generator. The stabilization of the arc frees up the downstream area of the anode for material injection into the hottest plasma flame zone for plasma processing.

According to the invention, the length of a vortex-stabilized plasma arc of a substantial length, one inch or longer, may be controlled. The method and device of the present invention disrupts stiff attachment of a plasma arc to the hollow exit electrode, and a simple mechanism is provided for rotating the attachment of the arc and reducing erosion where its finger attaches. The invention provides for arc attachment upstream of where material can be injected into the plasma flame through feed ports in the exit step.

According to the invention, there is provided a DC plasma arc generator which includes a cathode and a generally cylindrical anode together with a generally cylindrical interelectrode. The distal end of the interelectrode is spaced from the proximal end of the anode by a predetermined distance, and the inner diameter of the anode is greater than the inner diameter of the interelectrode. There is provided a means to introduce tangentially a first stream of a vortex-generating gas adjacent the proximal end of the interelectrode and another means to introduce tangentially a second stream of a vortex-generating gas in the space between the distal end of the interelectrode and the proximal end of the anode. A pair of opposing flanges provides a locality for the formation of an arc between them. One flange is disposed at the distal end of the interelectrode and the other is disposed at the proximal end in a face-to-face relationship with each other. The flanges are disposed at a step which is formed by the enlargement of the diameter from the interelectrode to the anode. The length of the space between the flanges is between about 0.03 and 0.15 times the length of the anode, and the length of the anode is 0.5 to 4 times its diameter. The diameter of the anode is 1.1 to 1.5 times greater than the inner diameter of the interelectrode. The length of the interelectrode is 3 to 10 times its diameter.

In addition, there is provided a method of operating the DC plasma arc generator described above. A first vortical flow of an ionizable gas is established in the interelectrode adjacent the cathode. A second vortical flow of an ionizable gas is established in the anode. The diameter of the interelectrode is less than that of the anode, such that the first vortical flow suddenly expands in diameter upon entry into the anode. The interelectrode is spaced from the anode and the space between the anode and the interelectrode serves as an entry point for the second vortical flow of gas. The anode and the interelectrode are electrically insulated from each other. Both the anode and the interelectrode have flanges extending from their perimeters and are disposed in a face-to-face relationship. A potential is established between the cathode and the anode and a first arc is established between the cathode and the distal end of the interelectrode and simultaneously a second arc is established between the flanges. The first vortical flow of gas is ionized and forces the first arc to revolve around the axis of the interelectrode, stabilizing it. The second arc ionizes the second flow of gas and forces a finger from the first arc to revolve around the distal end of the interelectrode whereby degradation and erosion due to the attachment of the finger is reduced. The stabilization is achieved by the exchanging of ions between the two arcs and by rotating the finger of the main arc along the primary site of its attachment thereby controlling the length of the arc.

Essentially there are two arcs in series with a common point of arc attachment and three arc terminations within the generator. These arcs are in a common electrical circuit fed by a single DC power supply. Since the cathode and the anode are directly connected to the power supply, they operate at fixed DC potentials. The interelectrode operates at a floating potential since it is connected to neither electrode.

DESCRIPTION OF THE PREFERRED EMBODIMENTS

Figure 1:
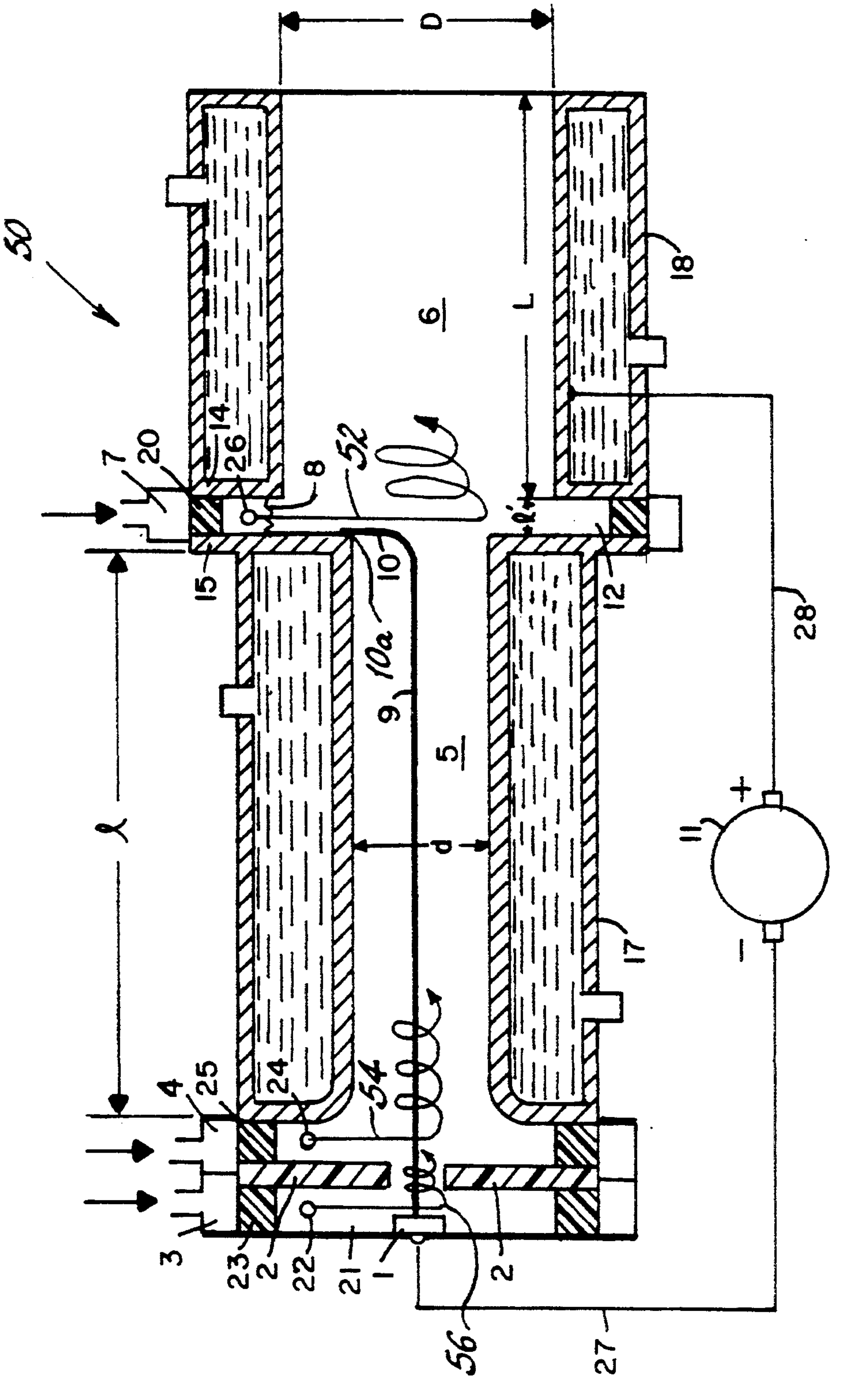
FIG. 1 is a cross-sectional view of a DC arc generator according to the present invention.

The arc generator 50 is formed of a hollow cylindrical interelectrode 5 and a hollow cylindrical anode 6. The interelectrode 5 and the anode 6 are separated from each other by a space 12 of predetermined width. The space 12 is formed between the distal end of the interelectrode 5 and the proximal end of the anode 6. A pair of flanges 14 and 15, spaced from each other and located at the distal end of the interelectrode and the proximal end of the anode, defines a space 12 which will support a radio frequency (RF) arc. A manifold 7 is disposed between the flanges 14 and 15 and is arranged to tangentially inject gas 52 to generate a vortical gas flow which tangentially intersects a vortical flow of gas 54 from the interelectrode 5. The interelectrode 5 is electrically insulated from the anode 6 by a ceramic ring 20, commonly made from alumina, zirconia or beryllia.

At the proximal end of the arc generator a cathode 1 is connected to the negative side of a DC power supply 11. The composition of the cathode 1 is of materials conventional for such cathodes. The positive side of the power supply is connected to the anode 6. A high RF (0.1 to 2 MHz) voltage is needed to ignite the DC arc. This voltage is momentarily applied to the cathode 1 and the anode 6. A small flow of inert gas 56 such as argon, nitrogen or helium is introduced into manifold 3 to protect the cathode 1 from chemical erosion of reactive plasma gases. The gas is distributed tangentially through holes 22 formed in a ceramic ring 23 of material such as discussed above. Working gases 54 are introduced through manifold 4. The gas is distributed tangentially into the cathode area 21 through holes 24 formed in a ceramic ring 25 such as discussed above. Such gases include inert gases such as nitrogen, argon, and helium, or reactive gases such as hydrogen, air, oxygen, carbon monoxide or hydrocarbons. A ceramic spacer 2 is disposed between the rings 23 and 25 to provide a separation between the cathode area and the rest of the interelectrode 5. The arrangement of such gases and the means for their introduction is well known to the art. Gases introduced through the manifolds 3 and 4 enter the interelectrode 5 in a spiralling gas flow in a plane which is normal to the axis of the vortex-generating ceramic rings 23, 25, as shown in the drawing as a swirl. The flow spirals through the interelectrode 5 and moves toward the anode 6.

Additional working gases 52 are introduced through the manifold 7. The gas 52 introduced through manifold 7 can be identical to the gas 54 introduced through manifold 4 and it too spirals inwardly as it enters the space 12 between the flanges 14 and 15. The spiraling flow has a linear component of motion perpendicular to the axis of the vortex-generating ring 20. The linear component of both flows facilitates the intersection and mixing of the flows while the tangential component of both flows stabilizes the main arc 9 and forces it to rotate and also forces the arc 9 to spin at its attachment point 10*a* to the interelectrode 5.

To provide for the swirling of the arc 9 and the attachment of a finger 10 to the distal end of the interelectrode 5, certain requirements must be met in the construction of the generator 50. The inner diameter (D) of the anode 6 must be 1.1 to 1.5 times greater, and preferably 1.15 to 1.3 times greater, than the inner diameter (d) of the interelectrode 5. Moreover, the width of the space (1') between the flanges 14 and 15 must be between about 0.03 and 0.15 times, and preferably between 0.05 and 0.08 times, the length (L) of the anode 6. The length (L) of the anode 6 is 0.5 to 4 times its diameter (D). The length of (1) of the interelectrode 5 must be 3 to 10 times its diameter (d).

A negative cable 27 of the DC power supply 11 is connected to the cathode 1 and a positive cable 28 is connected to the anode 6. The high RF (0.1 to 2 MHz) voltage needed to ignite the DC arc 9 is momentarily applied to the electrodes via these cables. In the presence of all gases 52, 54 and 56 injected through manifolds 3, 4 and 7, respectively, the RF discharge takes a path of least resistance in the form of two RF discharges in series, that is, a first arc 9 between the cathode 1 and the closest site of the arc constricting portion 5, and also a second arc 8 between the two flanges 14 and 15. During the transition of the establishment of the DC discharge, the DC arc 9 initially follows the ionized gaseous path established by the RF discharge. At this moment two short DC arcs coexist, one 9 being between the cathode 1 and the distal end of the interelectrode 5 (by way of finger 10) and another 8 across the space 12 between the two flanges 14 and 15.

The flow of gases 54 and 56 introduced through manifolds 3 and 4, respectively, and the low pressure inside the anode 6 due to the tangential injection of gases 54 and 56 forces the arc 9 to stretch by moving its attachment point 10*a* down the interior wall of the interelectrode 5 toward the space 12 between the flanges 14 and 15.

The space 12 between flanges 14 and 15 limits movement of the radial attachment of the finger 10 of the main arc 9 because the space 12 between the flanges 14 and 15 remains shielded by dynamic gas flow from the main flow of the gas within the interelectrode 5. The gas 52 injected tangentially in the space 12 becomes ionized due to arcing 8 across the gap between the flanges 14 and 15. This arcing forms a constantly ionized vortical flow which is normal to the plane of the main flow of the gases 54 and 56 from manifolds 3 and 4. The stretch of arc 9 leads to increasing the arc voltage drop and higher ionization of the vortical flow of working gas. Both ionized vortical gas flows constantly intersect and remain in electrical contact by the interchange of ions. This prevents disruption of the electrical circuit during stretching of the arc 9. Under the above conditions for constant completion of the DC electric circuit due to arcing across the space 12 the movement of the attached finger 10 of the arc 9 is limited by the length 1 of the interelectrode 5. At this length the arc 9 attains its highest possible voltage.

The DC electric circuit now includes a fully developed arc 9 of length 1 in series with an arc 8 of length 1' between the interelectrode 5 and the anode 6, both arcs being supported by the DC power supply 11. The two intersecting vortical flows of ionized gases electrodynamically stabilize the main arc 9 in the area of the arc attachment 10*a* to the interelectrode 5. Stabilization is achieved by the exchange of ions by rotating the arc attachment 10*a* along the distal end of the interelectrode 5, thereby controlling the length of the main arc 9.

In the above arc generator 50, the interelectrode 5 and the anode 6 are cooled by means of water jackets 17 and 18 as is conventional in the art. The cathode 1 can be made out of tungsten doped with 2% thoria and is mounted in the center of a cathode holder by conventional means, such as brazing, pressing or threaded connection. The gas which is injected into the generator 50 is forced through injectors to provide the gas flow rate to generate incoming gas at sonic or supersonic tangential velocities. The ceramic rings 20, 23 and 25 also function as electrical insulators between metal components of the generator. They have several equally-spaced tangential holes which are adjusted to provide the desired gas flow rate.

The following specific examples are considered to be illustrative of operational methods of the invention:

EXAMPLE 1

A double-arc plasma generator of the following dimensions, in which the length of the arc is controlled by dynamic gas flow, was constructed.

d=0.550"
1/d=3.863
1=2.125"
1/L=0.073
1'=0.155"
D/d=1.163
D=0.640"
L/D=2.15
L=1.375"

An industrial DC power supply with 100% rated load of 88 kw at 1100 amps and 80 volts was used to feed the generator. The power supply had falling volt-ampere characteristics. It had an open circuit voltage of about 160 volts and could support a voltage of about 125 to 130 volts in the range of 200 to 700 amps. An industrial spark-gap oscillator was used to start the DC arc via an RF discharge. The oscillator generated 4000 volts at a frequency of about 1 to 2 MHz.

Two working gas compositions were tested: 200 standard cubic feet per hour (scfh) of argon plus 25 scfh of hydrogen, and 200 scfh of argon plus 10 scfh of nitrogen. A flow of 25 scfh of argon was used as a protective gas and also acted as a plasma gas component. A flow of 120 scfh of argon was used for fixation of the arc length.

Figure 2:
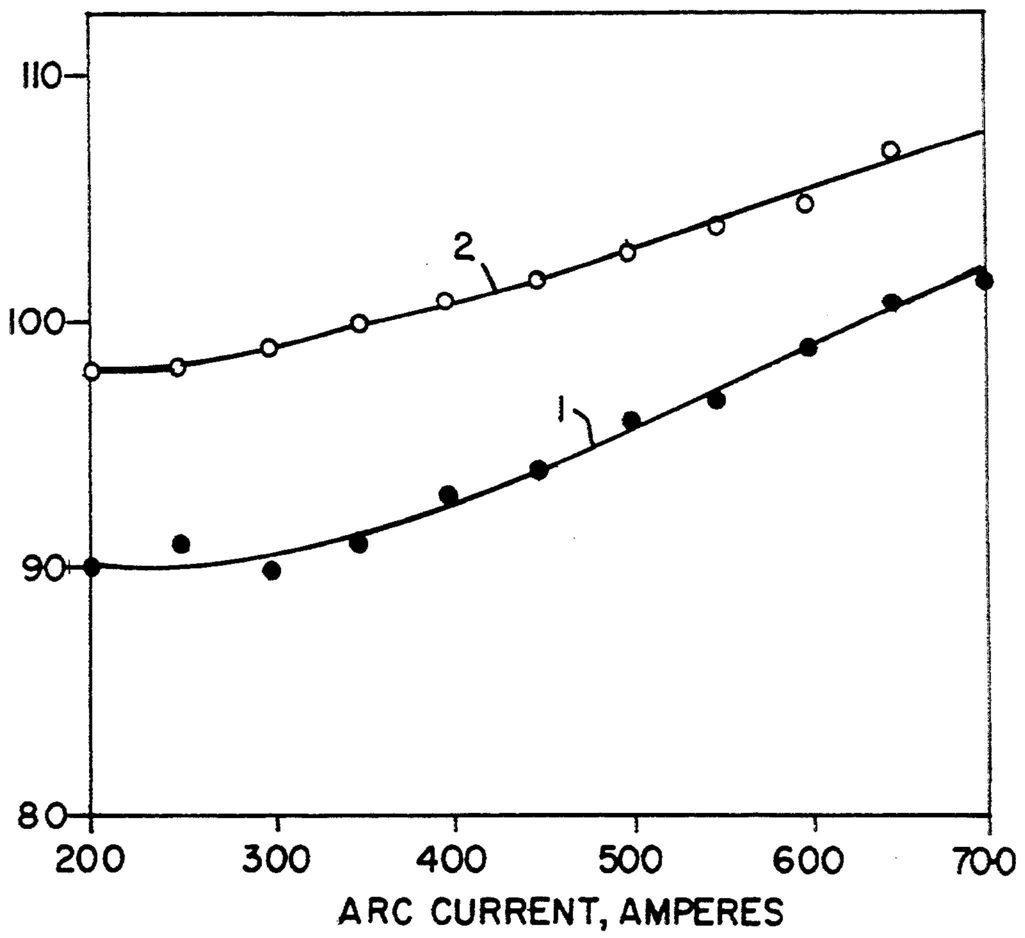
FIG. 2 represents the volt-ampere characteristics of plasma arcs that have their lengths fixed with gas dynamics.

The volt-amp curves for argon-hydrogen and argon-nitrogen arcs are set out in FIG. 2. Within the tested current range of 200 to 700 amps the curves exhibit a rising nature, voltage increasing with current. Such curves only occur with arcs of fixed length. In contrast, arcs with self-established length get shorter with length and decrease in voltage. Due to rising volt-ampere characteristics, 81 to 87% of the power from the DC source was extracted via increased arc voltage and reduced arc current. Such efficiencies result in decreased erosion of the electrodes in plasma generators and an increase in life.

EXAMPLE 2

The plasma generator set out in Example 1 was used. Argon was injected as a cathode protective gas with the flow rates mentioned above. The working gas composition was 125 scfh argon and 65 scfh nitrogen. The overall composition of the plasma gas produced an increase in the arc voltage to 130 volts and lowered the arc current to 600 amps. The generator thus operated at a point of stable arc operation of the power supply volt-amp curve at a power level of 78 kw (88.6% of the power supply capacity).

The generator was tested for 50 hours with the above conditions and no noticeable drifting in arc voltage or current occurred during the test, indicating a good control of the arc length.

After the test, the plasma generator components were examined. The downstream edge of the constricted portion of the anode was chamfered due to electrically-induced erosion. This indicated that the edge served as the primary site of arc attachment. The opposing surfaces of the anodes were substantially pitted due to arcing between them. Tracks on the pitted surface indicated rotation on the plasma zone in the area of the arc length stabilization. However, the erosion of the above components was not detrimental and the electrodes were still in working condition.

While there have been described particular embodiments of the invention and disclosed practical operating figures and dimensions, the invention is intended to include all variations and modifications within the spirit and scope of the present following claims.

I claim:

1. A DC plasma arc generator comprising:

a generally cylindrical anode and a generally cylindrical interelectrode, each being coaxial with the other, said anode and said interelectrode each having distal and proximal ends, said distal end of said interelectrode being spaced from said proximal end of said anode by a predetermined distance, the inner diameter of said anode being greater than the inner diameter of said interelectrode, said interelectrode being electrically insulated from said anode prior to arc ignition;

a cathode disposed adjacent said proximal end of said interelectrode and electrically insulated therefrom;

means to introduce tangentially a vortex-generating gas adjacent said proximal end of said interelectrode;

means to introduce tangentially a second stream of a vortex-generating gas in the space between said distal end of said interelectrode and said proximal end of said anode;

means forming an arc-generating locality in said space between said distal end of said interelectrode and said proximal end of said anode;

means for establishing two arcs, a first arc between said cathode and said distal end of said interelectrode and a second arc in said arc-generating locality.

2. The arc generator according to claim 1 wherein a power supply is connected solely between said cathode and said anode.

3. The arc generator of claim 1 wherein said means forming said arc-generating locality is a pair of opposing flanges, one flange being disposed at said distal end of said interelectrode and the other flange being disposed at said proximal end of said anode, said flanges being arranged in a face-to-face relationship with each other.

4. The arc generator of claim 1 wherein the inner diameter of said anode is 1.1 to 1.5 times greater than the inner diameter of said interelectrode.

5. The arc generator of claim 1 wherein said predetermined distance is between 0.03 and 0.15 times the length of said anode.

6. The arc generator of claim 1 wherein the length of said anode is 0.5 to 4 times its diameter.

7. The arc generator of claim 1 wherein the length of said interelectrode is 3 to 10 times its diameter.

8. A DC plasma arc generator comprising:

a generally cylindrical anode and a generally cylindrical interelectrode, each being coaxial with the other, said anode and said interelectrode each having distal and proximal ends, said distal end of said interelectrode being spaced from said proximal end of said anode by 0.03 to 0.15 times the length of said interelectrode, the length of said interelectrode being 3 to 10 times its inner diameter, the inner diameter of said anode being 1.1 to 1.5 times the inner diameter of said interelectrode, the length of said anode being 0.5 to 4 times its inner diameter, said interelectrode being insulated from said anode prior to arc ignition;

a cathode adjacent said proximal end of said interelectrode and electrically insulated therefrom;

means to introduce tangentially a first stream of a vortex-generating gas adjacent said proximal end of said interelectrode;

means to introduce tangentially a second stream of a vortex-generating gas in space between said distal end of said interelectrode and said proximal end of said anode;

means forming an arc-generating locality in said space between said distal end of said interelectrode and said proximal end of said anode;

means for establishing two arcs, a first one between said cathode and said distal end of said interelectrode and a second arc in said arc-generating locality.

9. A method of controlling the arc length in a vortex-stabilized DC plasma arc generator, the steps comprising:

establishing a first vortical flow of an ionizable gas in a first cylindrical chamber, said chamber having a proximal and a distal end, said first vortical flow being adjacent a cathode disposed adjacent said proximal end of said first chamber, said cathode being electrically insulated from said first chamber;

establishing a second vortical flow of an ionizable gas in a second cylindrical chamber, said second chamber having a proximal and a distal end, the diameter of said second chamber being greater than the diameter of said first chamber, whereby the diameter of said first vortical flow suddenly expands upon entry of said first vertical flow into said second chamber, said proximal end of said second chamber being spaced from said distal end of said first chamber, the space between said first and second chambers serving as the source for establishing said second vortical flow of gas, said chambers being electrically insulated from each other prior to arc ignition, said proximal end of said second chamber and said distal end of said first chamber each having flanges extending from their perimeters and being disposed in a face-to-face relationship, said first chamber being electrically insulated from said second chamber prior to arc ignition;

imposing a potential between said cathode and said second chamber and establishing a first arc between said cathode and said distal end of said first chamber and simultaneously establishing a second arc between said flanges, said first vortical flow of gas forcing said first arc to revolve around the axis of said first chamber to stabilize said first arc, said second arc ionizing said second flow of gas and forcing a finger from said first arc to revolve around said distal end of said first chamber whereby degradation and erosion of said first chamber due to the attachment of said finger is reduced.

10. The method according to claim 9 wherein the diameter of said vortical flow in the second chamber is 1.1 to 1.5 times greater than the diameter of said vortical flow in the first chamber.

11. A method of operating a DC plasma arc generator having a cathode, a generally cylindrical anode and a generally cylindrical interelectrode, said anode and said interelectrode being coaxial with each other, said anode and said interelectrode each having distal and proximal ends, said cathode being disposed adjacent said proximal end of said interelectrode, said distal end of said interelectrode being spaced from said proximal end of said anode by 0.03 to 0.15 times the length of said anode, the length of said interelectrode being 3 to 10 times greater than its inner diameter, the inner diameter of said anode being 1.1 to 1.5 times greater than the inner diameter of said interelectrode, said anode having a length that is 0.5 to 4 times its diameter, said cathode, said interelectrode and said anode being electrically insulated from each other prior to arc ignition, said method comprising:

introducing tangentially a first stream of a vortex-generating gas adjacent said proximal end of said interelectrode to establish a vortical flow of said gas;

introducing tangentially a second stream of a vortex-generating gas into the space between said distal end of said interelectrode and said proximal end of said anode, said second stream intersecting said first stream;

imposing a potential between said cathode and said anode and forming a first arc between said cathode and said distal end of said interelectrode and a second arc in the space between said interelectrode and said anode, said first stream of gas forcing said first arc to revolve about the axis of said interelectrode, said first arc forming a finger which revolves about said distal end of said interelectrode, said second arc ionizing the gas of the second stream and forcing said finger of said first arc to remain attached to said distal end of said interelectrode.

* * * * *